US008757470B2

(12) United States Patent
Ohashi et al.

(10) Patent No.: US 8,757,470 B2
(45) Date of Patent: Jun. 24, 2014

(54) FRICTION STIR WELDING APPARATUS AND METHOD (71) Applicant: Kawasaki Jukogyo Kabushiki Kaisha, Kobe (JP)

(72) Inventors: Ryoji Ohashi, Kobe (JP); Mitsuo Fujimoto, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/957,504

(22) Filed: Aug. 2, 2013

(65) Prior Publication Data

US 2013/0320070 A1   Dec. 5, 2013

Related U.S. Application Data (62) Division of application No. 13/513,101, filed as application No. PCT/JP2010/007029 on Dec. 2, 2010, now Pat. No. 8,528,803.

(30) Foreign Application Priority Data

Dec. 7, 2009   (JP) ................... 2009-277908

(51) Int. Cl.
*B23K 20/12* (2006.01)

(52) U.S. Cl.
CPC ............ *B23K 20/12* (2013.01); *B23K 20/1205* (2013.01); *B23K 20/121* (2013.01); *B23K 20/1215* (2013.01); *B23K 20/122* (2013.01); *B23K 20/1225* (2013.01); *B23K 20/123* (2013.01); *B23K 20/1235* (2013.01); *B23K 20/1245* (2013.01); *B23K 20/125* (2013.01); *B23K 20/126* (2013.01); *B23K 20/127* (2013.01)
USPC .......... 228/112.1; 228/113; 228/144; 228/2.1

(58) Field of Classification Search
CPC .. B23K 20/12; B23K 20/1205; B23K 20/121; B23K 20/1215; B23K 20/122; B23K 20/1225; B23K 20/123; B23K 20/1235; B23K 20/1245; B23K 20/125; B23K 20/126; B23K 20/127
USPC ................ 228/2.1, 122.1, 113, 114
See application file for complete search history.

(56) References Cited

U.S. PATENT DOCUMENTS

2005/0001009 A1   1/2005   Raether et al.
2010/0176182 A1   7/2010   Hanlon et al.

FOREIGN PATENT DOCUMENTS

| JP | A-2004-538156 | 12/2004 |
| JP | A-2006-021217 | 1/2006 |
| JP | A-2008-073694 | 4/2008 |

OTHER PUBLICATIONS

International Search Report issued in Application No. PCT/JP2010/007029; dated Feb. 8, 2011 (With Translation).

*Primary Examiner* — Erin Saad
(74) *Attorney, Agent, or Firm* — Oliff PLC (57) ABSTRACT A friction stir welding method in which a welding tool rotating around an axis is pressed against a welding target portion of workpieces supported by a backing member so that frictional heat is generated and the friction heat softens the welding target portion. The welding tool is at least partially inserted into the softened welding target portion and stirs the softened welding target portion so that the welding target portion is stir welded in a solid phase state. The friction stir welding method includes detecting a temperature of a temperature measurement point provided in the backing member, and calculating an estimated temperature of the welding tool from the detected temperature of the temperature measurement point, based on a predefined correlation between a temperature of the welding tool and a temperature of the backing member.

4 Claims, 5 Drawing Sheets

FRICTION STIR WELDING APPARATUS AND METHOD

TECHNICAL FIELD

This is a Division of application Ser. No. 13/513,101 filed Jun. 20, 2012, which is a U.S. National Stage Application No. PCT/JP2010/007029, filed Dec. 2, 2010. The disclosure of the prior applications are hereby incorporated by reference herein in their entirety.

The present invention relates to a friction stir welding apparatus and a friction stir welding method of joining a plurality of steel members together.

BACKGROUND ART

Friction Stir Welding (FSW) is a conventionally known method of joining a plurality of steel members together. Friction stir welding is a method in which: a protrusion provided at the tip of a welding tool is, while being rotated, pressed against a welding target portion of a plurality of steel members to be joined, so that the welding target portion and its surrounding portion are softened due to frictional heat and the welding target portion and its surrounding portion, which have been softened, are stirred and thereby a plastic flow is caused; then the welding tool is removed from the welding target portion and the welding target portion is cooled down; and as a result, the plurality of steel members are joined together.

Patent Literatures 1 and 2 disclose an apparatus and a method of performing spot joining using the above-described friction stir welding. Patent Literature 1 discloses a friction stir apparatus configured to reduce wear of a protrusion of a welding tool by softening a welding target portion with laser light before inserting the welding tool into the welding target portion. Patent Literature 2 discloses a friction stir welding method, in which the operation of a welding tool is controlled in accordance with the temperature of a welding target portion of a plurality of steel members on which welding is being performed, and thereby the welding target portion is suppressed from transforming into a martensitic structure when cooling down. In the welding method, a receiving member is disposed at the opposite side to the welding tool, with the welding target portion positioned between them, and the receiving member receives pressure from the welding tool. The receiving member includes a temperature sensor configured to measure the temperature of the welding target portion. When the temperature of the welding target portion, which is detected by the temperature sensor, reaches or exceeds an A3 transformation point, processing conditions such as the rotational speed and the pressing force of the welding tool are adjusted. The A3 transformation point is a temperature at which a metallographic structure is transformed into an austenite structure. After the processing conditions are adjusted, when the temperature of the welding target portion is reduced to an A1 transformation point or lower, the welding tool is removed from the welding target portion. The A1 transformation point is a eutectoid temperature.

CITATION LIST

Patent Literature

PTL: 1 Japanese Laid-Open Patent Application Publication No. 2006-21217
PTL: 2 Japanese Laid-Open Patent Application Publication No. 2008-73694

SUMMARY OF INVENTION

Technical Problem

In friction stir welding, during welding processing, if the welding tool (in particular, the protrusion) is worn, it may cause the welding tool to be inserted into the welding target portion more quickly than normal and may result in an excessive increase in the temperature of the welding tool. If the temperature of the welding tool increases excessively, the life of the welding tool is reduced due to the overheating, resulting in frequent replacement of the welding tool. This is unfavorable in terms of economic efficiency. Moreover, if the welding processing is performed by using the welding tool that is worn excessively, it may cause poor joining. In order to eliminate such problems, it is desired to manage the temperature status of the welding tool during the welding processing. However, in order to directly detect the temperature of the welding tool of a conventional friction stir welding apparatus, since the welding tool rotates, it is necessary to construct an expensive remote-controlled measurement system configured to perform remote control between a temperature detector included in the welding tool and a measurement apparatus body. In addition, the welding tool of the friction stir welding apparatus is regularly replaced. Each time such maintenance work is performed, it involves detachment and attachment of the temperature detector included in the welding tool. If the receiving member, which receives pressure from the welding tool, is provided with a temperature sensor configured to measure the temperature of the welding target portion and thus the temperature of the welding target portion is detected as disclosed in Patent Literature 2, then the aforementioned problem in the case where the temperature detector is included in the welding tool is eliminated. However, generally speaking, the temperature of the welding target portion during the welding is lower than that of the welding tool. When the temperature of the welding target portion reaches the A3 transformation point (approximately 900° C.), the actual temperature of the welding tool at the time is expected to be higher than 1200° C. For this reason, there is a risk that the friction joining method disclosed in Patent Literature 2 causes a reduction in the life of the welding tool.

The present invention has been made to solve the above-described problems. The present invention is directed to a friction stir welding apparatus that includes a welding tool and performs friction stir welding on workpieces, and to a friction stir welding method. An object of the present invention is to provide a function of monitoring the temperature of the welding tool during welding, thereby preventing the life of the welding tool from being wastefully reduced.

Solution to Problem

A friction stir welding apparatus according to the present invention includes: a welding tool having, at its tip, a protrusion which comes into contact with a welding target portion of workpieces; a rotation driver configured to cause the welding tool to rotate around an axis; a movement driver configured to cause the welding tool to move in an axis direction; a backing member configured to support the workpieces during welding by contacting the welding target portion at an opposite side to a side at which the welding tool contacts the welding target portion during the welding in which the welding tool moves and presses the welding target portion of the workpieces while rotating; a controller configured to control operations of the rotation driver and the movement driver based on preset processing conditions; a temperature detector configured to detect a temperature of a temperature measurement point provided in the backing member; and a temperature monitor configured to obtain the temperature of the temperature measurement point and to calculate, based on a predefined correlation between a temperature of the welding tool and a temperature of the backing member, an estimated temperature of the welding tool from the temperature of the temperature measurement point.

A friction stir welding method according to the present invention is a method in which: a welding tool rotating around an axis is pressed against a welding target portion of workpieces supported by a backing member, so that frictional heat is generated and the friction heat softens the welding target portion; and the welding tool is at least partially inserted into the softened welding target portion and stirs the softened welding target portion, so that the welding target portion is stir welded in a solid phase state. The friction stir welding method includes: detecting a temperature of a temperature measurement point provided in the backing member; and calculating an estimated temperature of the welding tool from the detected temperature of the temperature measurement point, based on a predefined correlation between a temperature of the welding tool and a temperature of the backing member.

According to the above, the welding tool's temperature estimated from the temperature detected during welding by the temperature detector included in the backing member for the welding tool is obtained and recorded. Temperatures recorded in this manner are arranged in chronological order and analyzed. Through the analysis, the temperature status of the welding tool can be monitored. Monitoring the temperature of the welding tool makes it possible to detect a risk of overheating of the welding tool and to perform a procedure for preventing the overheating. Moreover, the temperatures of the welding tool that are recorded during the welding can be used to ensure the quality of joints between the workpieces. The backing member, not the welding tool which rotates, is provided with the temperature detector configured to indirectly detect the temperature of the welding tool. This allows wiring for the temperature detector in the apparatus to be simplified, and prevents the apparatus configuration from becoming complex and large.

Further, in the friction stir welding apparatus, it is preferred that the controller forcibly ends welding processing if the estimated temperature of the welding tool reaches a preset upper limit temperature. Similarly, it is preferred that the friction stir welding method further includes: comparing the estimated temperature of the welding tool with a preset upper limit temperature; and forcibly ending welding processing if the estimated temperature of the welding tool reaches the upper limit temperature.

According to the above, if the estimated temperature of the welding tool reaches the upper limit temperature, the welding processing is forcibly ended. This makes it possible to prevent the welding tool from being overheated and thereby to use the welding tool without causing a reduction in the life of the welding tool. Moreover, a situation where the welding processing is performed with the welding tool when the welding tool is worn and results in poor joining can be prevented since overheating of the welding tool is caused by wear of the welding tool.

Alternatively, in the friction stir welding apparatus, if the estimated temperature of the welding tool reaches the preset upper limit temperature, it is preferred that the controller changes one of or a combination of any of the following: a welding processing time; a rotational frequency of the welding tool; and a pressing force of the welding tool against the welding target portion, such that the estimated temperature of the welding tool becomes the upper limit temperature or lower. Similarly, it is preferred that the friction stir welding method further includes: comparing the estimated temperature of the welding tool with a preset upper limit temperature; and changing, if the estimated temperature of the welding tool reaches the upper limit temperature, one of or a combination of any of the following: a welding processing time; a rotational frequency of the welding tool; and a pressing force of the welding tool against the welding target portion, such that the estimated temperature of the welding tool becomes the upper limit temperature or lower.

According to the above, processing conditions for the welding processing are adjust such that the temperature of the welding tool does not exceed the upper limit temperature. This prevents the welding tool from being overheated and makes it possible to use the welding tool without causing a reduction in the life of the welding tool.

In the friction stir welding apparatus, it is preferred that the temperature monitor measures a peak temperature reaching time from when welding processing starts to when the estimated temperature of the welding tool reaches a peak temperature, and the controller forcibly ends the welding processing if the peak temperature reaching time is out of a preset normal value range. Similarly, it is preferred that the friction stir welding method further includes: measuring a peak temperature reaching time from when welding processing starts to when the estimated temperature of the welding tool reaches a peak temperature; and forcibly ending the welding processing if the peak temperature reaching time is out of a preset normal value range.

In the above, if the peak temperature reaching time is out of the normal value range (in particular, if the peak temperature reaching time is shorter than the normal value range), it can be assumed that the welding tool is worn and thereby the welding tool is inserted into the welding target portion more quickly than normal. In such a case, the welding processing is forcibly ended. This makes it possible to prevent the welding tool from being overheated and to prevent an occurrence of a situation where the welding processing is performed with the welding tool which is worn and results in poor joining.

In the friction stir welding apparatus, it is preferred that the temperature measurement point is positioned on an extension of the axis around which the welding tool rotates. Further, in the friction stir welding apparatus, it is preferred that the temperature measurement point T is positioned inside of the backing member and is away from a face of the backing member by a distance no less than 0.3 mm and no greater than 0.5 mm, the face contacting the workpieces. Accordingly, the temperature detector and the welding tool do not directly interfere with each other, and changes in the temperature of the welding tool can be precisely detected by the temperature detector.

Advantageous Effects of Invention

According to the present invention, during friction stir welding, the temperature of the welding tool can be estimated from the temperature detected by the temperature detector included in the backing member for the welding tool, and the temperature of the welding tool can be monitored based on the estimated temperature of the welding tool. By monitoring changes in the temperature of the welding tool, the temperature status of the welding tool can be known. Accordingly, a procedure for preventing overheating of the welding tool can be performed as necessary, and also, an occurrence of poor joining can be prevented. Moreover, the obtained information about the changes in the temperature of the welding tool can be used to ensure the quality of joints between the workpieces.

DESCRIPTION OF EMBODIMENTS

Hereinafter, embodiments of the present invention will be described in detail with reference to the drawings. In the drawings, the same or corresponding components are denoted by the same reference signs, and a repetition of the same description is avoided below.

(Configuration of Friction Stir Welding Apparatus 1)

Figure 1:
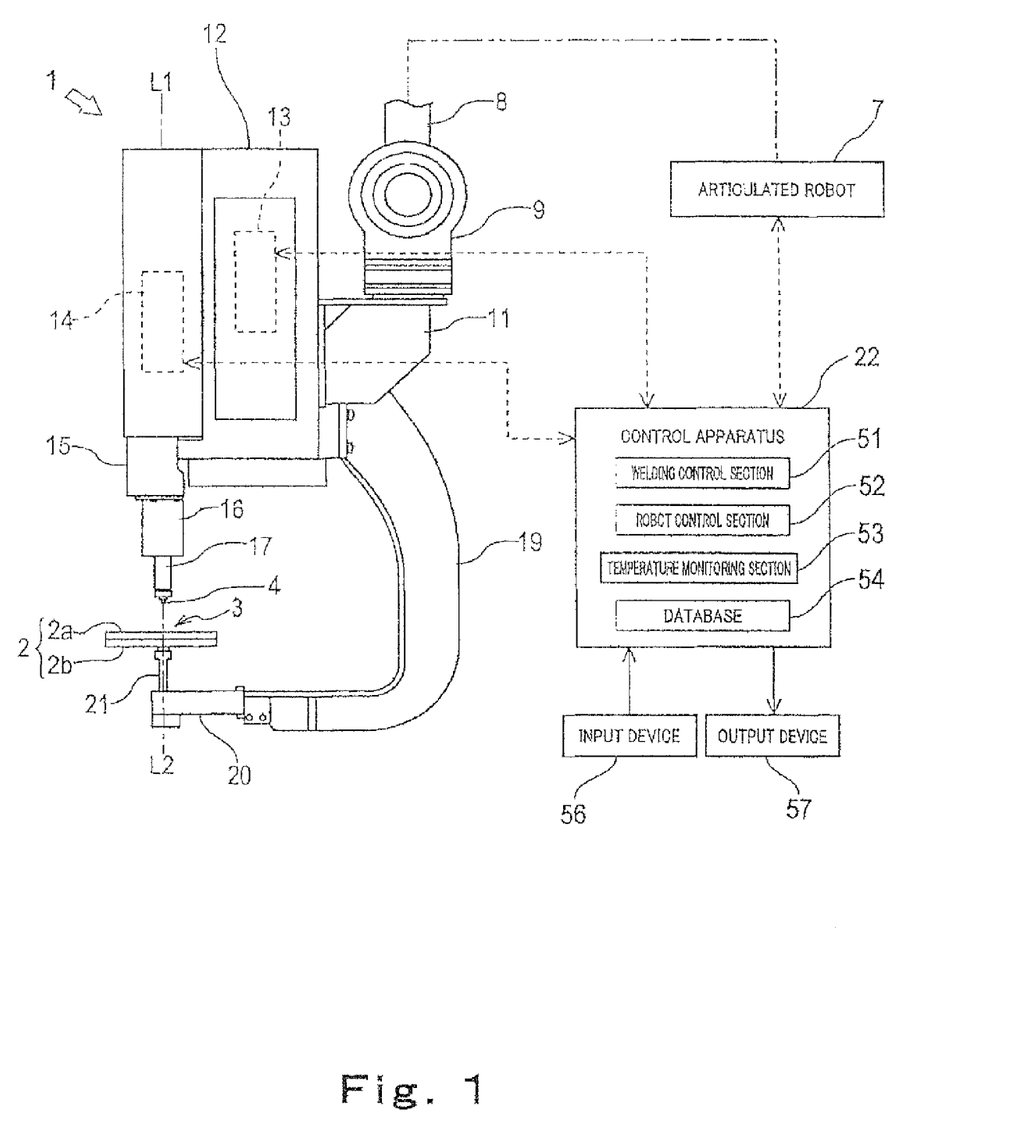
FIG. 1 schematically shows an overall structure of a friction stir welding apparatus according to an embodiment of the present invention.

As shown in FIG. 1, a friction stir welding apparatus 1 according to an embodiment of the present invention includes a welding tool 4 configured to rotate around an axis. The friction stir welding apparatus 1 is configured to: press the welding tool 4 against a welding target portion 3 of workpieces 2 while rotating the welding tool 4, thereby softening the welding target portion 3 and its surrounding portion by frictional heat; and insert a part of the welding tool 4 into the softened welding target portion 3 and cause a plastic flow by stirring, with the rotation of the welding tool 4, the welding target portion 3 and its surrounding portion which have been softened. When the welding target portion 3 of the workpieces 2 is cooled down and hardened, the welding target portion 3 becomes a joint formed by solid-phase welding. It should be noted that the workpieces 2 are a plurality of material pieces that can be joined together by friction stir welding. The workpieces 2 according to the present embodiment are two steel plates 2a and 2b, one of which is laid on the other.

The friction stir welding apparatus 1 includes: a main body 12; a movable body 15 configured to move in a reciprocating manner in an axis L1 direction with respect to the main body 12; a tool holder 16 provided at the lower end of the movable body 15; a rotating rod 17 rotatably provided at the lower end of the tool holder 16; and a welding tool 4 attached to the rotating rod 17. The friction stir welding apparatus 1 may further include an inert gas supply unit configured to supply inert gas to the welding tool 4. The welding tool 4 has a pin 48 (a protrusion) at its tip. The pin 48 is either cylindrical or in the shape of a circular truncated cone, and is formed of a hard ceramic material (such as silicon nitride). The welding tool 4 is detachably attached to the rotating rod 17, and therefore, the welding tool 4 can be replaced with a new one when worn out.

The main body 12 includes a linear movement drive unit 13 and a rotation drive unit 14. The linear movement drive unit 13, which is a movement driver for moving the movable body 15, is configured to cause the movable body 15 to move in the axis L1 direction in a reciprocating manner. For such function, the linear movement drive unit 13 includes a servomotor and a power transmitter which is configured to transmit the torque of the servomotor to the movable body 15 as linear movement force along the axis L1. The rotation drive unit 14, which is a rotation driver for the rotating rod 17, is configured to cause the rotating rod 17 to rotate around an axis L2 (rotation axis). For such function, the rotation drive unit 14 includes a servomotor and a rotation power transmitter which is configured to transmit the torque of the servomotor to the rotating rod 17 as a rotational force around the axis L2. It should be noted that the axis L1 and the axis L2 are substantially parallel to each other.

When the friction stir welding apparatus 1 is used, the friction stir welding apparatus 1 is attached to, for example, a wrist 9 of a robot arm 8 of an articulated robot 7 in order to move, in relation to the welding target portion 3 of the workpieces 2, the welding tool 4 to a position suitable for performing welding processing. The friction stir welding apparatus 1 includes a connecting frame 11 and a bent arm 19, which allow the apparatus to be detachably attached to the wrist 9 of the robot arm 8 of the articulated robot 7. One side of the connecting frame 11 is fixed to the wrist 9 of the robot arm 8, and the other side of the connecting frame 11 is fixed to the main body 12 of the friction stir welding apparatus 1. The bent arm 19 is bent in a substantially L shape. The upper end of the bent arm 19 is fixed to the main body 12, and the lower end of the bent arm 19 is extended to a position below the welding tool 4, at which position a support platform 20 is provided. The support platform 20 includes a backing member 21 which is positioned on an extension of the rotation axis (axis L2) of the welding tool 4.

Figure 2:
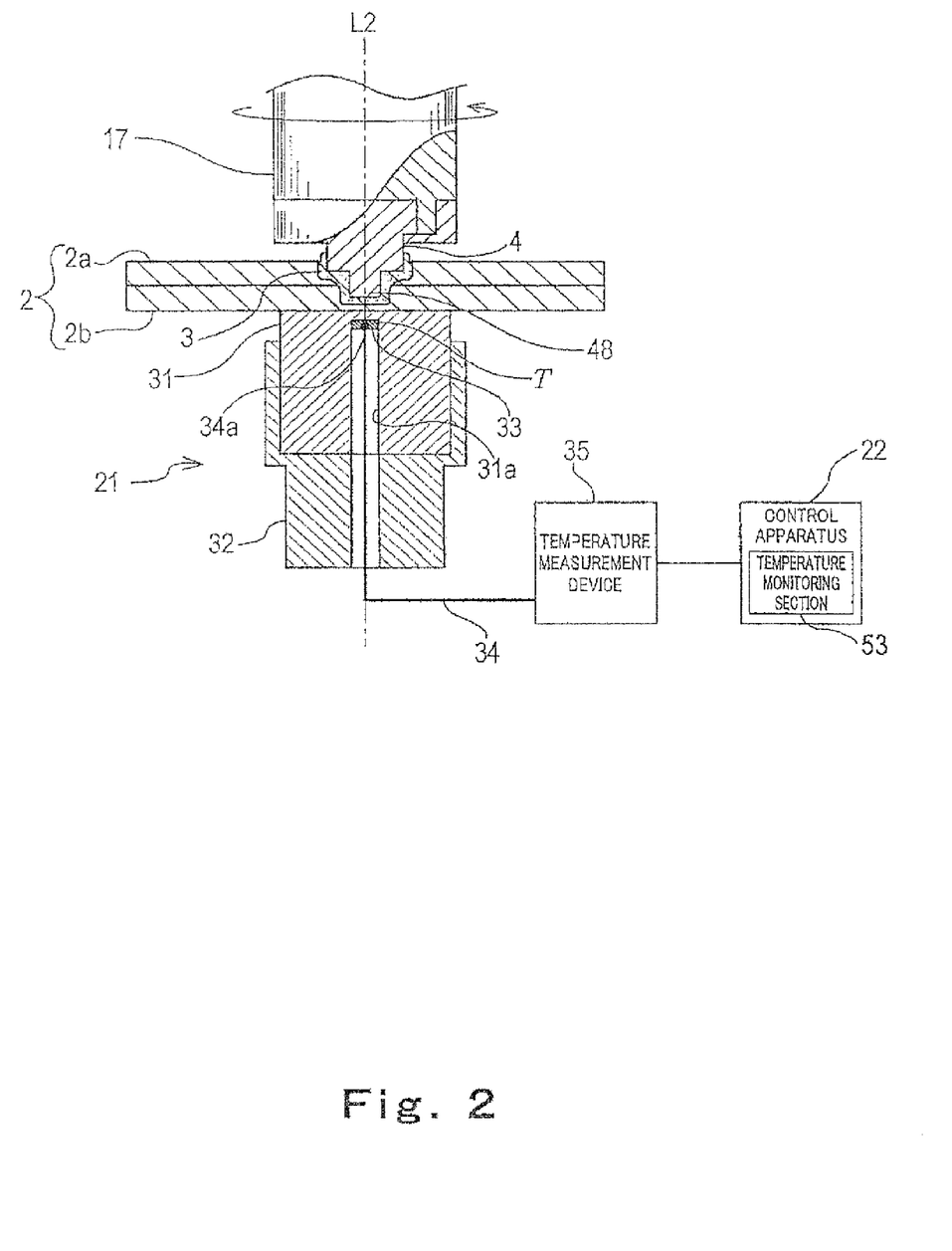
FIG. 2 is a partial cross-sectional view showing a state of a welding tool and a support during welding.

The backing member 21 is configured such that, at the time of welding, when the welding tool 4 moves and presses the welding target portion 3 of the workpieces 2 while rotating, the backing member 21 contacts the welding target portion 3 at the opposite side to a side at which the welding tool 4 contacts the welding target portion 3, thereby supporting the workpieces 2 which receive pressure from the welding tool 4. As shown in FIG. 2, the backing member 21 includes a substantially columnar backing portion 31 and a holder 32 holding the backing portion 31. Among components forming the backing member 21, at least the backing portion 31 is formed of a hard ceramic material such as silicon nitride. The backing portion 31 is held in the holder 32 such that one end face of the backing portion 31 is exposed. The one end face of the backing portion 31 is opposed to the pin 48 of the welding tool 4. The backing member 21 supports the workpieces 2 by contacting, with the one end face of the backing portion 31, the backside of the welding target portion 3 of the workpieces 2. Hereinafter, the one end face, of the backing portion 31, which contacts the workpieces 2 is referred to as a "top face" and another end face, of the backing portion 31, which is the opposite face to the top face, is referred to as a "bottom face".

The backing portion 31 has a detection hole 31a formed therein. The detection hole 31a forms an opening in the bottom face of the backing portion 31 and has a diameter of approximately 2.0 mm. The detection hole 31a is positioned on an extension of the rotation axis (axis L2) of the welding tool 4. The bottom of the detection hole 31a is away from the top face of the backing portion 31 by a distance approximately no less than 0.3 mm and no greater than 0.5 mm. The bottom of the detection hole 31a is defined as a temperature measurement point T for indirectly detecting the temperature of the welding tool 4. As a temperature detector for detecting the temperature of the temperature measurement point T, the friction stir welding apparatus 1 includes a thermocouple 34 and a temperature measurement device 35. The thermocouple 34 is connected to the temperature measurement device 35, and the temperature measurement device 35 is connected to a control apparatus 22 which will be described below.

The thermocouple 34 has a detection point 34a connected to an isothermal material 33 which is laid out all over the bottom of the detection hole 31a of the backing portion 31. The isothermal material 33 is formed of a good conductor which is thermally or electrically conductive. The isothermal material 33 is aluminum, for example. Preferably, the detection point 34a of the thermocouple 34 is positioned on an extension of the rotation axis (axis L2) of the welding tool 4 so that changes in the temperature of the welding tool 4 can be detected precisely. However, in the present embodiment, the isothermal material 33 is provided all over the bottom of the detection hole 31a so that temperature detection can be performed over a wide area rather than at a point. As a result, the thermocouple 34 is allowed to be displaced from the axis L2 of the detection point 34a.

The temperature measurement device 35 includes a voltmeter and detects thermoelectromotive force which is generated between the cold junction (not shown) of the thermocouple 34 and the detection point 34a, thereby measuring the temperature of the detection point 34a. The temperature measurement device 35 transmits the measured temperature of the detection point 34a to the control apparatus 22 which will be described below. The measured temperature of the detection point 34a is the temperature of the temperature measurement point T in the backing member 21. The temperature of the temperature measurement point T in the backing member 21 which is in contact with the workpieces 2 is used for indirectly detecting the temperature of the welding tool 4.

As described above, the temperature of the welding tool 4 is indirectly detected at the backing member 21, the temperature of which is lower than that of the welding tool 4. For this reason, a relatively inexpensive and readily available detector, for example, a chromel-alumel thermocouple (K-type thermocouple), may be used as the thermocouple 34. Moreover, the temperature measurement point T is provided in the backing member 21 which is fixed and positioned relative to the main body 12. Accordingly, the thermocouple 34 and the temperature measurement device 35 can be connected to each other by wire. This simplifies the wiring structure. As a result, a significant increase in volume or weight due to incorporating the thermocouple 34 and the temperature measurement device 35 is prevented. Furthermore, since the detection point 34a of the thermocouple 34 is positioned in the backing member 21, there is no possibility that the thermocouple 34 becomes damaged due to coming into direct contact with the welding target portion 3 or the welding tool 4. In addition, the backing member 21 needs to be replaced less frequently than the welding tool 4. This eliminates a necessity of onerous work, such as disassembling the backing member 21 and rewiring the thermocouple 34, to be performed each time maintenance of the apparatus is performed.

The friction stir welding apparatus 1 further includes the control apparatus 22. The control apparatus 22 includes functional sections which are: a welding control section 51 configured to control operations of the friction stir welding apparatus 1; a robot control section 52 configured to control operations of the articulated robot 7; and a temperature monitoring section 53 configured to record and monitor the status of the temperature of the welding tool 4. The control apparatus 22 is so-called a computer including: a CPU (Central Processing Unit); an EEPROM (Electrically Erasable and Programmable Read Only Memory) which is configured to store, in a rewritable manner, programs executed by the CPU and data used for these programs; and a RAM (Random Access Memory) which is configured to temporarily store data at the time of executing a program. For example, an input device 56 configured to input information such as commands and processing conditions into the control apparatus 22, and an output device configured to output results of processing performed by the control apparatus 22, are connected to the control apparatus 22. Further, the control apparatus 22 is electrically connected to the articulated robot 7, the linear movement drive unit 13, the rotation drive unit 14, and the temperature measurement device 35. Through execution of a predetermined program by the CPU, the control apparatus 22 can implement the functions of the above-described functional sections 51, 52, and 53. In the present embodiment, the control apparatus 22, which is a single computer, implements the functions of the welding control section 51, the robot control section 52, and the temperature monitoring section 53. However, as an alternative, the functions of these sections may be implemented by multiple computers, respectively, in a distributed manner.

(Flow of Welding Processing by Friction Stir Welding Apparatus 1)

Hereinafter, a flow of welding processing performed by the friction stir welding apparatus 1 configured as above is described. In preparation for the welding processing, processing conditions are set via the control apparatus 22 in accordance with, for example, the material and the thickness of the steel plates 2a and 2b to be joined. The processing conditions include: a target rotational frequency (rotational speed) of the welding tool 4; a pressing force of the welding tool 4; a maximum plunging extent (extent of insertion into the welding target portion 3) of the welding tool 4; and a welding processing time (insertion time). As one example of the processing conditions, the target rotational frequency of the welding tool 4 may be set to 2000 rpm and the pressing force of the welding tool 4 may be set to 4440 N when the material of the steel plates 2a and 2b to be joined is SPCC270 specified in JISG3141 "Cold-reduced carbon steel sheet and strip". The workpieces 2 are positioned such that the welding target portion 3 is in contact with the top face of the backing portion 31 of the backing member 21.

At the start of welding processing, the welding control section 51 of the control apparatus 22 controls the rotation drive unit 14 to cause the rotating rod 17 and the welding tool 4 to rotate in an integrated manner. When the rotational frequency of the welding tool 4 reaches the target rotational frequency, the control apparatus 22 controls the linear movement drive unit 13 to cause the welding tool 4 to move along the axis L1 until the pin 48 comes into contact with the welding target portion 3 of the workpieces 2. As a result, the welding target portion 3 of the workpieces 2 is sandwiched and pressed by the pin 48 of the welding tool 4 and the backing portion 31 of the backing member 21, and is also heated up by frictional heat that is generated between the rotating pin 48 and the welding target portion 3. Thereafter, the welding target portion 3 and its surrounding portion of the workpieces 2 are softened due to the frictional heat.

When the rotation and pressing by the welding tool 4 are further continued, the pin 48 of the welding tool 4 is inserted into the softened welding target portion 3 by a predetermined extent and stirs a portion around the pin 48. This causes a plastic flow in the welding target portion 3 of the workpieces 2. After the predetermined welding processing time (insertion time of the pin 48) has elapsed, the control apparatus 22 controls the rotation drive unit 14 to cause reverse rotation of the welding tool 4, and controls the linear movement drive unit 13 to cause the welding tool 4 to move in such a direction that the welding tool 4 is removed from the welding target portion 3 of the workpieces 2. When the welding tool 4 is removed from the welding target portion 3 of the workpieces 2, the welding target portion 3 is cooled down and then hardened. In this manner, the welding performed on the welding target portion 3 is completed.

During the above-described welding processing performed by the friction stir welding apparatus 1, the temperature monitoring section 53 of the control apparatus 22 records a temperature history (i.e., temperature changes) of the of the welding tool 4, thereby monitoring changes in the temperature of the welding tool 4. Although the temperature monitoring section 53 according to the present embodiment has a function of recording and monitoring the temperature of the welding tool 4, the function may be separated into a function of recording the temperature of the welding tool 4 and a function of monitoring the temperature of the welding tool 4. Then, the present embodiment may include a temperature recording section which implements the temperature recording function and a temperature monitoring section which implements the temperature monitoring function.

Figure 3:
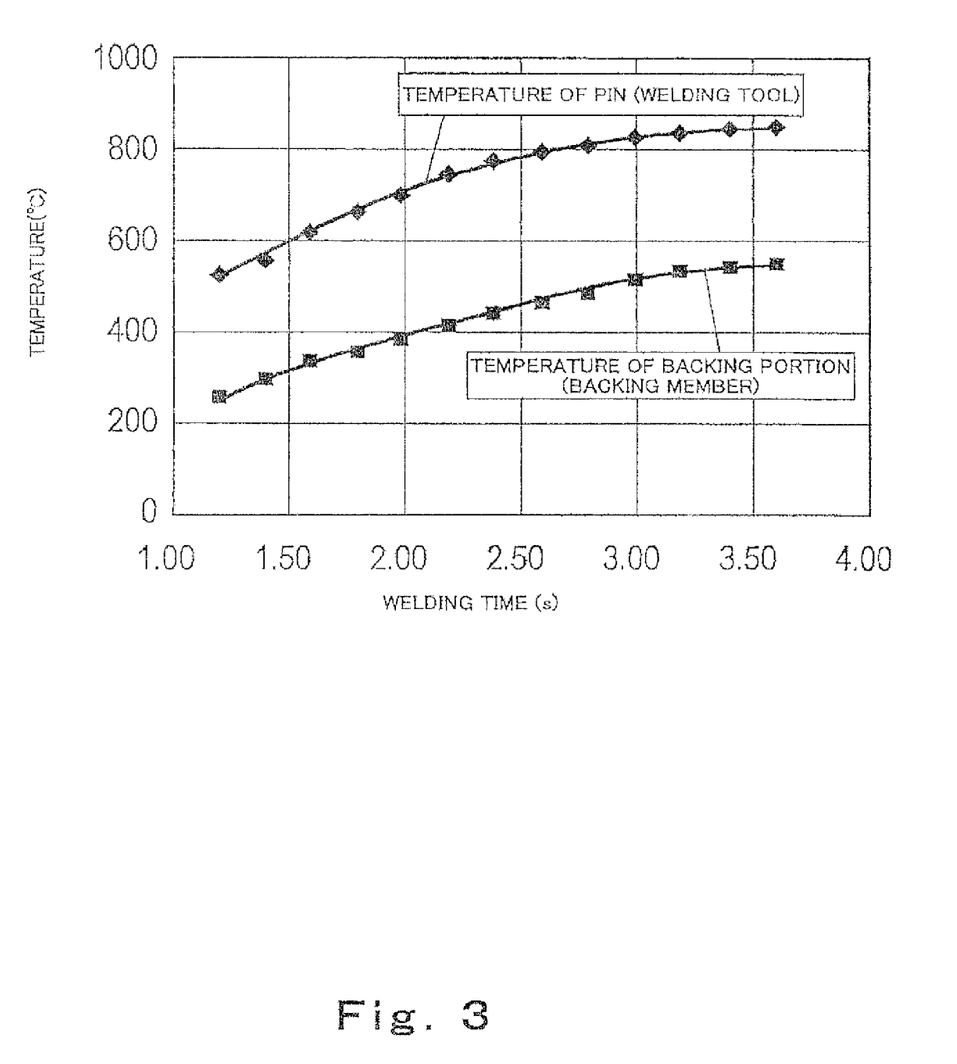
FIG. 3 is a graph showing a relationship between the temperature of a pin of the welding tool and the temperature of a backing portion of a backing member during welding.

FIG. 3 is a graph showing a relationship between the temperature of the pin of the welding tool and the temperature of the backing portion of the backing member during welding. In the graph of FIG. 3, the vertical axis represents temperature; the horizontal axis represents the welding processing time; each diamond symbol represents the temperature of the pin 48 of the welding tool 4; and each square symbol represents the temperature of the backing portion 31 of the backing member 21 (to be precise, the temperature of the bottom of the detection hole 31a). It should be noted that the graph of FIG. 3 is created based on data that was obtained from experimentally performed friction stir welding processing by the friction stir welding apparatus 1. The data was obtained by measuring, with a radiation thermometer, the temperature of the pin 48 and the temperature of the backing portion 31 of the backing member 21 immediately after removal of the pin 48 of the welding tool 4 from the welding target portion 3 of the workpieces 2 in the middle of the welding processing. It is clear from the graph of FIG. 3 that there is a correlation between the temperature of the pin 48 of the welding tool 4 and the temperature of the backing portion 31 of the backing member 21. Therefore, during welding, the temperature of the pin 48 of the welding tool 4 can be estimated by detecting the temperature of the backing portion 31 of the backing member 21. It should be noted that information indicating the correlation between the temperature of the pin 48 of the welding tool 4 and the temperature of the backing portion 31 of the backing member 21 (i.e., the temperature of the temperature measurement point T) (hereinafter, the information is referred to as "tool-measurement point temperature correlation data"), as illustratively shown in the graph of FIG. 3, is obtained from an experiment, simulation, or the like for each combination of the pin 48 of the welding tool 4 and the workpieces 2. The obtained tool-measurement point temperature correlation data is prestored in the control apparatus 22 in an available manner in the form of an equation, a map, or a table.

Figure 4:
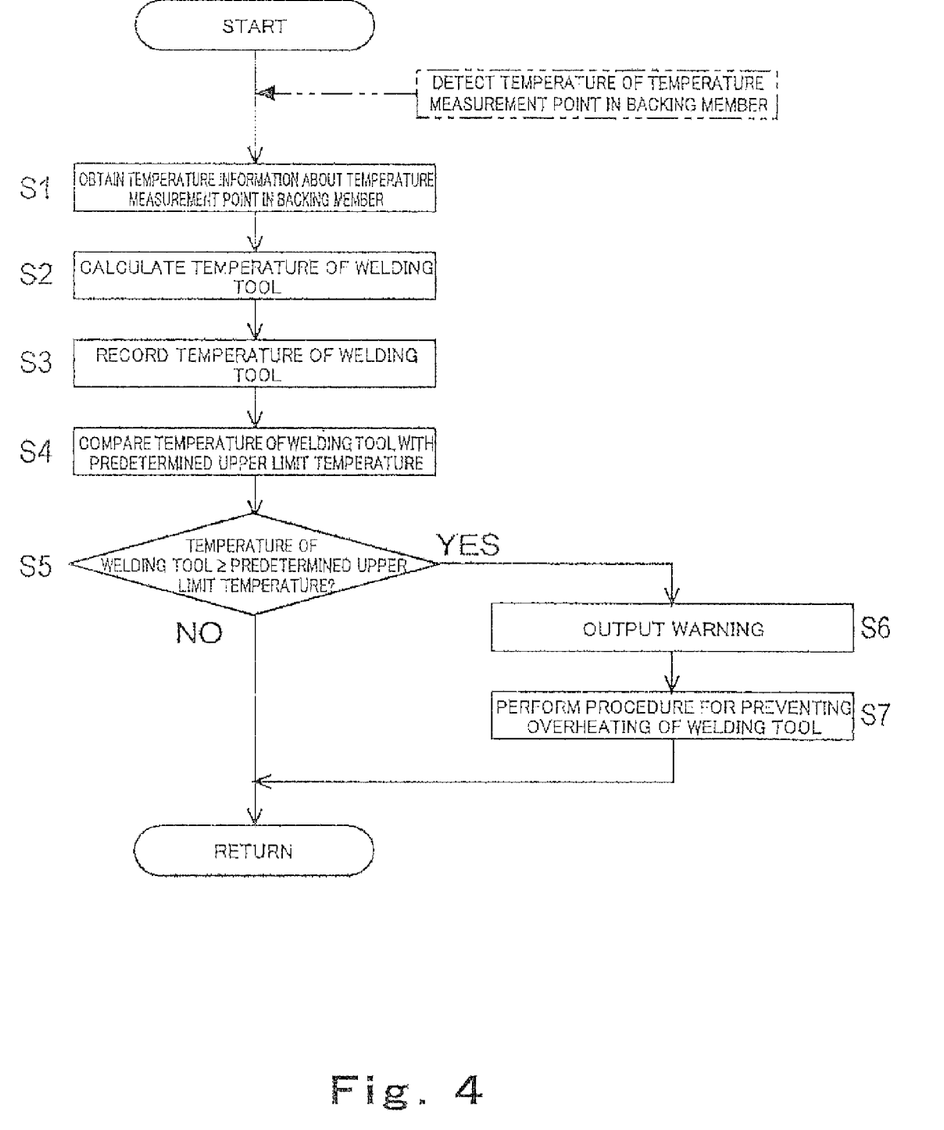
FIG. 4 is a flowchart illustrating a flow of processing by a control apparatus.

FIG. 4 is a flowchart illustrating a flow of processing by the temperature monitoring section 53 of the control apparatus 22. As shown in FIG. 4, the temperature monitoring section 53 of the control apparatus 22 obtains temperature information about the temperature measurement point T, which is detected by means of the thermocouple 34 and the temperature measurement device 35 during the aforementioned welding processing (i.e., obtains temperature information about the backing portion 31 of the backing member 21 (step S1). Based on the obtained temperature about the temperature measurement point T and the tool-measurement point temperature correlation data, the temperature monitoring section 53 calculates an estimated temperature of the welding tool 4 (more specifically, the pin 48 of the welding tool 4) (step S2). Then, the temperature monitoring section 53 records the calculated temperature of the welding tool 4 in a memory or a database 54 (step S3). In the above manner, the temperature monitoring section 53 calculates and records the temperature of the welding tool 4 continuously or intermittently at predetermined intervals, thereby creating a temperature history of the welding tool 4, in which the recorded temperatures of the welding tool 4 are arranged in chronological order. It should be noted that the temperatures of the welding tool 4 recorded in the database 54 can be used to ensure joining of the workpieces 2.

During the welding processing, the temperature of the welding tool 4 increases due to friction. If the temperature increases excessively, the life of the welding tool 4 is reduced due to overheating, resulting in frequent replacement of the welding tool 4. This is unfavorable in terms of economic efficiency. Therefore, the temperature monitoring section 53 of the control apparatus 22 monitors changes in the temperature of the welding tool 4 in a manner as described below.

The temperature monitoring section 53 of the control apparatus 22 compares the recorded temperature of the welding tool 4 in the database 54 with a predetermined upper limit temperature (step S4). It should be noted that the predetermined upper limit temperature is suitably determined depending on the welding tool 4, and is prestored in the control apparatus 22 in an available manner. For example, since the welding tool 4 according to the present embodiment contains silicon nitride, the upper limit temperature is set to approximately 850° C., which does not cause a wasteful reduction in the life of the welding tool 4.

In step S4, if the temperature of the welding tool 4 becomes or exceeds the predetermined upper limit temperature (YES in step S5), the temperature monitoring section 53 outputs a warning via an output device 57 (in step S6), and causes the welding control section 51 to perform a predetermined procedure for preventing overheating of the welding tool 4 (step S7). The predetermined procedure for preventing overheating of the welding tool 4 is, for example, either a procedure of forcibly ending the welding processing or a procedure of suitably adjusting the processing conditions. For example, the procedure of suitably adjusting the processing conditions includes one of or a combination of any of the following: a procedure of adjusting the pressing force by adjusting the output of the linear movement drive unit 13; a procedure of adjusting the rotational speed (rotational frequency) of the welding tool 4 by adjusting the output of the rotation drive unit 14; and a procedure of adjusting the welding processing time (the insertion time of the welding tool 4).

As described above, if the temperature of the welding tool 4 reaches the upper limit temperature, the welding processing is forcibly ended or the processing conditions for the welding processing are adjusted such that the temperature of the welding tool 4 does not exceed the upper limit temperature. This makes it possible to prevent the welding tool 4 from being overheated and thereby to use the welding tool 4 without causing a reduction in the life of the welding tool 4. Moreover, a situation where the welding processing is performed with the welding tool 4 when the welding tool 4 is worn and results in poor joining can be prevented since overheating of the welding tool 4 is caused when a friction area is increased due to wear of the welding tool 4.

When the pin 48 of the welding tool 4 is worn, it may result in an insufficient degree of joining at the joint between the workpieces 2, which joint is obtained from the welding processing. Therefore, if the welding tool 4 is worn to an intolerable degree, the welding tool 4 needs to be replaced.

Figure 5:
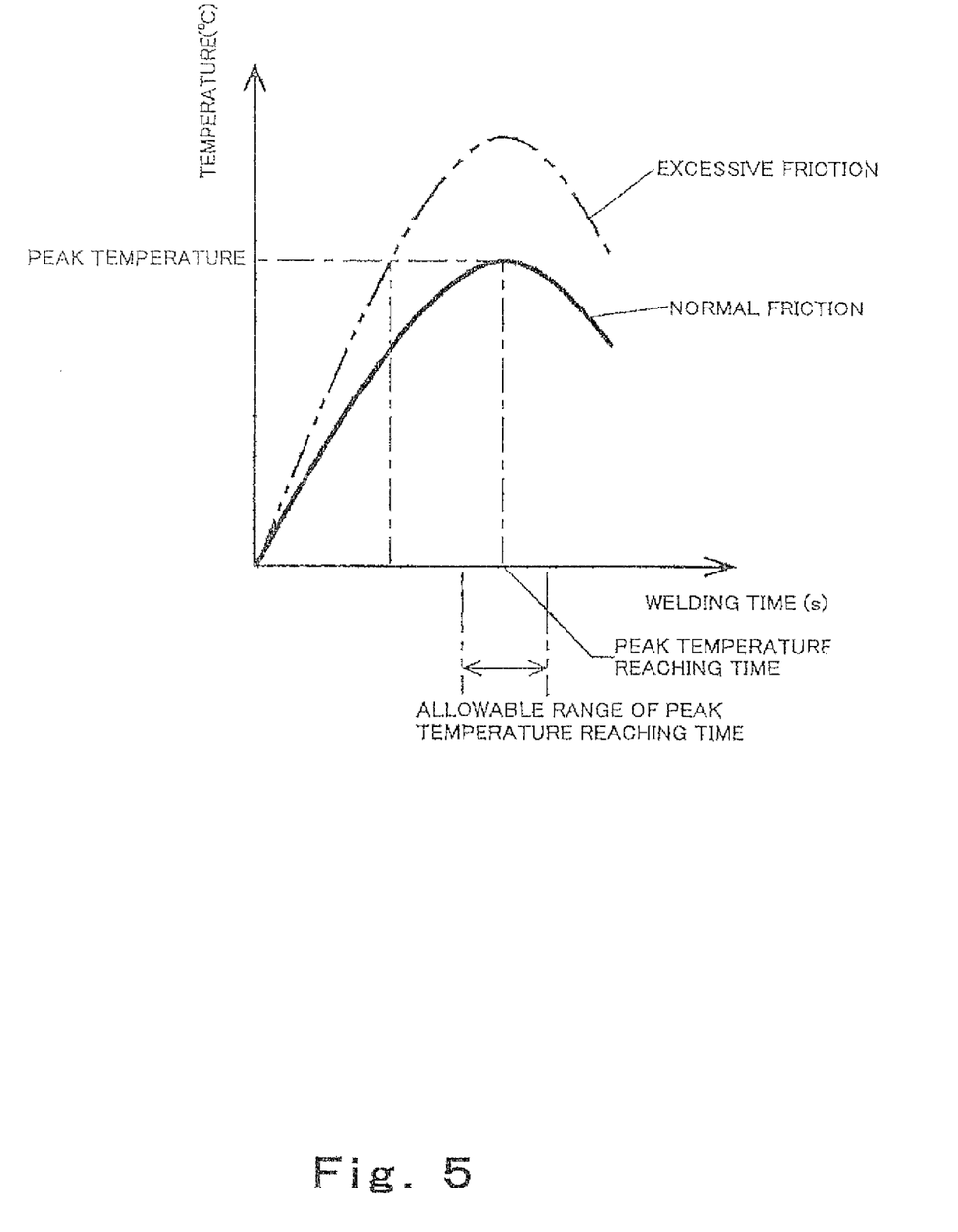
FIG. 5 is a graph showing temporal changes in the temperature of the pin of the welding tool during welding.

FIG. 5 is a graph showing temporal changes in the temperature of the welding tool during the welding. In the graph of FIG. 5, the vertical axis represents the temperature of the welding tool; the horizontal axis represents the welding processing time; the solid line represents changes in the temperature of the welding tool in the case of normal friction; and the two-dot chain line represents changes in the temperature of the welding tool in the case of excessive friction. It is clear from the graph of FIG. 5 that in the case where the welding tool 4 is worn and a friction area is excessively increased, the temperature of the welding tool 4 reaches a predetermined peak temperature in a shorter welding processing time than in the case of normal friction. The temperature monitoring section 53 is configured to use such temperature change characteristics of the welding tool 4 to manage the heating status and wear status of the welding tool 4. Specifically, the temperature monitoring section 53 of the control apparatus 22 measures, based on the created temperature history of the welding tool 4, a peak temperature reaching time when the temperature of the welding tool 4 reaches the predetermined peak temperature. If the peak temperature reaching time is out of a predetermined normal value range, the temperature monitoring section 53 outputs a warning via the output device 57 and causes the welding control section 51 to forcibly end the welding processing.

If the peak temperature reaching time is out of the normal value range (in particular, if the peak temperature reaching time is shorter than the normal value range), it can be assumed that the welding tool 4 is worn and thereby the welding tool 4 is inserted into the welding target portion 3 more quickly than normal. If it is assumed that the welding tool 4 is worn, the welding processing may be forcibly ended. This makes it possible to prevent the welding tool 4 from being overheated, and also to prevent an occurrence of a situation where the welding processing is performed with the welding tool 4 which is worn and results in poor joining.

Other Embodiments

In the above-described embodiment, the friction stir welding apparatus 1 is used for spot joining of two steel plates 2a and 2b, one of which is laid on the other. However, the friction stir welding apparatus 1 may be used not only for spot joining of two steel plates but also for spot joining of, for example, workpieces 2 that are three or more steel plates stacked one above another. Moreover, the joining performed by the friction stir welding apparatus 1 is not limited to spot joining. For example, the friction stir welding apparatus 1 may be configured to join two steel plates that are aligned side-by-side. In this case, a welding target portion that has a linear shape is backed with the backing member 21; a temperature detector is provided in such a manner as to be able to measure a temperature over the entire length of the backing member 21; and the welding tool 4 may be controlled based on the temperature of the welding tool 4 that is indirectly detected by the temperature detector.

While preferred embodiments of the present invention are as described above with reference to the drawings, it will be understood that those skilled in the art, upon attaining an understanding of the foregoing, will readily conceive of various alterations and modifications to these embodiments without departing from the scope of the present invention. Therefore, such alterations and modifications are construed to fall within the scope of the present invention, which is to be determined from the claims.

INDUSTRIAL APPLICABILITY

The present invention is applicable to friction stir welding apparatuses, in particular, to a friction stir welding apparatus suited to join together workpieces that are steel materials, for example, steel materials for a general structure, steel materials for an architectural structure, or steel plates for a vehicle such as a railway vehicle or an automobile.

REFERENCE SIGNS LIST 1 friction stir welding apparatus
2 workpieces
3 welding target portion
4 welding tool
4 8 pin (protrusion)
7 articulated robot
11 connecting frame
12 main body
13 linear movement drive unit
14 rotation drive unit
15 movable body
16 tool holder
17 rotating rod
20 support platform
21 backing member
22 control apparatus
31 backing portion
31a detection hole
32 holder
33 isothermal material
34 thermocouple
35 temperature measurement device
51 welding control section
52 robot control section
53 temperature monitoring section

The invention claimed is:

1. A friction stir welding method in which:
a welding tool rotating around an axis is pressed against a welding target portion of workpieces supported by a backing member, so that frictional heat is generated and the friction heat softens the welding target portion; and the welding tool is at least partially inserted into the softened welding target portion and stirs the softened welding target portion, so that the welding target portion is stir welded in a solid phase state, the friction stir welding method comprising:
detecting a temperature of a temperature measurement point provided in the backing member; and
using a program to calculate an estimated temperature of the welding tool from the detected temperature of the temperature measurement point, based on a predefined correlation between a temperature of the welding tool and a temperature of the backing member.

2. The friction stir welding method according to claim 1, further comprising:
comparing the estimated temperature of the welding tool with a preset upper limit temperature; and
forcibly ending welding processing upon the estimated temperature of the welding tool reaches the upper limit temperature.

3. The friction stir welding method according to claim 1, further comprising:

comparing the estimated temperature of the welding tool with a preset upper limit temperature; and adjusting processing conditions including one of or a combination of any of the following: a welding processing time; a rotational frequency of the welding tool; and a pressing force of the welding tool against the welding target portion, the estimated temperature of the welding tool to the upper limit temperature or lower upon the estimated temperature of the welding tool reaches the upper limit temperature.

4. The friction stir welding method according to claim 1, further comprising:

monitoring a peak temperature reaching time from when welding processing starts to when the estimated temperature of the welding tool reaches a peak temperature; and forcibly ending welding processing upon the peak temperature reaching time is out of a preset normal value range.

* * * * *